(12) United States Patent
Nishikawa

(10) Patent No.: US 7,889,864 B2
(45) Date of Patent: Feb. 15, 2011

(54) DATA PROCESSING SYSTEM AND METHOD

(75) Inventor: Tomoki Nishikawa, Wakayama (JP)

(73) Assignee: Panasonic Corporation, Osaka (JP)

( * ) Notice: Subject to any disclaimer, the term of this patent is extended or adjusted under 35 U.S.C. 154(b) by 338 days.

(21) Appl. No.: 11/398,581

(22) Filed: Apr. 6, 2006

(65) Prior Publication Data

US 2006/0227967 A1    Oct. 12, 2006

(30) Foreign Application Priority Data

Apr. 11, 2005 (JP) ............... 2005-113641

(51) Int. Cl.
*H04N 7/167* (2006.01)
(52) U.S. Cl. .................. 380/210; 380/42; 380/239
(58) Field of Classification Search ............ 380/42–44, 380/255–256; 713/150, 189, 193; 726/26–30
See application file for complete search history.

(56) References Cited

U.S. PATENT DOCUMENTS

| | | | | |
|---|---|---|---|---|
| 3,798,360 A | * | 3/1974 | Feistel ................ | 380/37 |
| 4,078,152 A | * | 3/1978 | Tuckerman, III ....... | 380/37 |
| 4,107,458 A | * | 8/1978 | Constant ............. | 380/37 |
| 4,249,180 A | * | 2/1981 | Eberle et al. ......... | 380/37 |
| 4,258,433 A | * | 3/1981 | Herschtal et al. ..... | 370/465 |
| 4,267,592 A | * | 5/1981 | Craiglow ............ | 370/280 |
| 4,270,203 A | * | 5/1981 | Collins et al. ....... | 370/360 |
| 4,316,055 A | * | 2/1982 | Feistel .............. | 380/37 |
| 4,330,689 A | * | 5/1982 | Kang et al. .......... | 704/219 |
| 4,375,579 A | * | 3/1983 | Davida et al. ........ | 380/28 |
| 4,386,416 A | * | 5/1983 | Giltner et al. ....... | 710/68 |
| 4,418,425 A | * | 11/1983 | Fennel et al. ........ | 380/33 |
| 4,471,164 A | * | 9/1984 | Henry ................ | 380/30 |
| 4,535,355 A | * | 8/1985 | Arn et al. ........... | 380/212 |
| 4,596,898 A | * | 6/1986 | Pemmaraju ........... | 380/45 |
| 4,608,455 A | * | 8/1986 | McNair .............. | 380/43 |
| 4,742,544 A | * | 5/1988 | Kupnicki et al. ...... | 380/215 |
| 4,771,462 A | * | 9/1988 | Hannan et al. ........ | 380/44 |
| 4,797,921 A | * | 1/1989 | Shiraishi ............ | 380/28 |
| 4,802,217 A | * | 1/1989 | Michener ............ | 380/29 |

(Continued)

FOREIGN PATENT DOCUMENTS

JP    05-145923    6/1993

(Continued)

OTHER PUBLICATIONS

IEEE 100, The Authoritative Dictionary of IEEE Standards Terms, Dec. 2000, 7ed,.*

(Continued)

*Primary Examiner*—David J Pearson
(74) *Attorney, Agent, or Firm*—McDermott Will & Emery LLP

(57) ABSTRACT

A data processing system includes: a stream decoder for decrypting a stream encrypted by broadcast encryption to obtain a first decrypted stream; an internal buffer for storing the first decrypted stream; and an encryption/decryption processor. The encryption/decryption processor decrypts a stream encrypted by content encryption to obtain a second decrypted stream and storing the second decrypted stream in the internal buffer, and reads one of the first and second decrypted streams from the internal buffer and encrypts the read-out stream by content encryption.

9 Claims, 8 Drawing Sheets

U.S. PATENT DOCUMENTS

| | | | | |
|---|---|---|---|---|
| 4,803,725 A * | 2/1989 | Horne et al. | | 380/44 |
| 4,803,726 A * | 2/1989 | Levine et al. | | 380/274 |
| 4,810,975 A * | 3/1989 | Dias | | 331/78 |
| 4,815,130 A * | 3/1989 | Lee et al. | | 380/265 |
| 4,888,798 A * | 12/1989 | Earnest | | 705/54 |
| 4,979,832 A * | 12/1990 | Ritter | | 380/28 |
| 5,001,478 A * | 3/1991 | Nagy | | 341/67 |
| 5,001,754 A * | 3/1991 | Deffeyes | | 380/46 |
| 5,003,599 A * | 3/1991 | Landry | | 380/261 |
| 5,010,344 A * | 4/1991 | Nagy | | 341/65 |
| 5,010,345 A * | 4/1991 | Nagy | | 341/65 |
| 5,193,115 A * | 3/1993 | Vobach | | 380/46 |
| 5,341,425 A * | 8/1994 | Wasilewski et al. | | 380/212 |
| 5,365,588 A * | 11/1994 | Bianco et al. | | 380/42 |
| 5,365,589 A * | 11/1994 | Gutowitz | | 380/43 |
| 5,420,866 A * | 5/1995 | Wasilewski | | 370/426 |
| 5,533,127 A * | 7/1996 | Luther | | 380/28 |
| 5,619,337 A * | 4/1997 | Naimpally | | 386/83 |
| 5,696,826 A * | 12/1997 | Gao | | 380/28 |
| 5,734,721 A * | 3/1998 | Clark | | 380/46 |
| 5,754,651 A * | 5/1998 | Blatter et al. | | 380/241 |
| 5,757,909 A * | 5/1998 | Park | | 380/201 |
| 5,826,027 A * | 10/1998 | Pedersen et al. | | 709/221 |
| 5,844,595 A * | 12/1998 | Blatter et al. | | 455/83 |
| 5,894,328 A * | 4/1999 | Negishi | | 375/240.25 |
| 5,933,501 A * | 8/1999 | Leppek | | 380/259 |
| 5,946,399 A * | 8/1999 | Kitaj et al. | | 713/189 |
| 5,949,792 A * | 9/1999 | Yasuda et al. | | 370/474 |
| 5,983,252 A * | 11/1999 | Clapp | | 708/250 |
| 5,991,401 A * | 11/1999 | Daniels et al. | | 713/168 |
| 6,011,849 A * | 1/2000 | Orrin | | 380/42 |
| 6,035,040 A * | 3/2000 | Mann et al. | | 380/28 |
| 6,055,619 A * | 4/2000 | North et al. | | 712/36 |
| 6,067,595 A * | 5/2000 | Lindenstruth | | 710/307 |
| 6,069,902 A * | 5/2000 | Kurano et al. | | 370/535 |
| 6,070,198 A * | 5/2000 | Krause et al. | | 719/321 |
| 6,118,786 A * | 9/2000 | Tiernan et al. | | 370/416 |
| 6,163,842 A * | 12/2000 | Barton | | 713/176 |
| 6,230,219 B1 | 5/2001 | Fields et al. | | 710/22 |
| 6,233,338 B1 * | 5/2001 | Leppek | | 380/28 |
| 6,233,389 B1 * | 5/2001 | Barton et al. | | 386/46 |
| 6,236,727 B1 * | 5/2001 | Ciacelli et al. | | 380/212 |
| 6,252,907 B1 * | 6/2001 | Hwang | | 375/240.25 |
| 6,275,537 B1 * | 8/2001 | Lee | | 375/240.28 |
| 6,292,621 B1 * | 9/2001 | Tanaka et al. | | 386/56 |
| 6,353,930 B1 * | 3/2002 | Shimoji et al. | | 725/110 |
| 6,370,596 B1 * | 4/2002 | Dakhil | | 710/15 |
| 6,414,608 B1 * | 7/2002 | Nishida et al. | | 341/67 |
| 6,538,656 B1 * | 3/2003 | Cheung et al. | | 345/519 |
| 6,567,409 B1 * | 5/2003 | Tozaki et al. | | 370/395.64 |
| 6,754,853 B1 * | 6/2004 | DeKoning et al. | | 714/42 |
| 6,757,911 B1 * | 6/2004 | Shimoji et al. | | 725/136 |
| 6,779,198 B1 * | 8/2004 | Morinaga et al. | | 725/134 |
| 6,798,980 B1 * | 9/2004 | Seo | | 386/125 |
| 6,801,536 B1 * | 10/2004 | Foster et al. | | 370/412 |
| 6,925,577 B1 * | 8/2005 | Szucs et al. | | 713/600 |
| 6,938,162 B1 * | 8/2005 | Nagai et al. | | 713/189 |
| 7,082,539 B1 * | 7/2006 | Kitahara et al. | | 713/189 |
| 7,093,299 B1 * | 8/2006 | Kamijo et al. | | 726/29 |
| 2001/0018727 A1 * | 8/2001 | Ando et al. | | 711/112 |
| 2001/0033343 A1 * | 10/2001 | Yap et al. | | 348/734 |
| 2002/0059481 A1 * | 5/2002 | Nunally | | 710/5 |
| 2002/0090087 A1 * | 7/2002 | Tamura et al. | | 380/210 |
| 2002/0095382 A1 * | 7/2002 | Taoka et al. | | 705/50 |
| 2002/0177760 A1 * | 11/2002 | Ulug | | 600/300 |
| 2002/0194618 A1 * | 12/2002 | Okada et al. | | 725/132 |
| 2003/0097503 A1 * | 5/2003 | Huckins | | 710/104 |
| 2003/0235310 A1 * | 12/2003 | Saito et al. | | 380/281 |
| 2004/0088554 A1 * | 5/2004 | Kawaguchi | | 713/189 |
| 2004/0093505 A1 * | 5/2004 | Hatakeyama et al. | | 713/189 |
| 2004/0230717 A1 * | 11/2004 | Funatsu et al. | | 710/22 |
| 2004/0237100 A1 * | 11/2004 | Pinder et al. | | 725/31 |
| 2004/0240856 A1 * | 12/2004 | Yahata et al. | | 386/98 |
| 2004/0252981 A1 * | 12/2004 | Murayama | | 386/111 |
| 2005/0044327 A1 * | 2/2005 | Howard et al. | | 711/147 |
| 2005/0044397 A1 * | 2/2005 | Bjorkengren | | 713/200 |
| 2005/0047404 A1 * | 3/2005 | Kim et al. | | 370/382 |
| 2005/0060477 A1 * | 3/2005 | Wilkins et al. | | 710/305 |
| 2005/0086419 A1 * | 4/2005 | Neble et al. | | 711/100 |
| 2005/0163229 A1 * | 7/2005 | Okada et al. | | 375/240.28 |
| 2005/0177760 A1 * | 8/2005 | Oohira | | 714/2 |
| 2005/0201728 A1 * | 9/2005 | Park et al. | | 386/94 |
| 2005/0201729 A1 * | 9/2005 | Park et al. | | 386/94 |
| 2005/0289253 A1 * | 12/2005 | Edirisooriya et al. | | 710/22 |
| 2006/0039559 A1 * | 2/2006 | Wasilewski | | 380/228 |
| 2006/0222087 A1 * | 10/2006 | Bauman et al. | | 375/259 |
| 2006/0227967 A1 * | 10/2006 | Nishikawa | | 380/42 |
| 2006/0242429 A1 * | 10/2006 | Holtzman et al. | | 713/189 |
| 2006/0259431 A1 * | 11/2006 | Poisner | | 705/51 |
| 2007/0118761 A1 * | 5/2007 | Kawaguchi | | 713/189 |

FOREIGN PATENT DOCUMENTS

| | | |
|---|---|---|
| JP | 06-232822 | 8/1994 |
| JP | 07-297855 | 11/1995 |
| JP | 08-186807 | 7/1996 |
| JP | 08-287014 | 11/1996 |
| JP | 09-275381 | 10/1997 |
| JP | 10-143437 | 5/1998 |
| JP | 11-150564 | 6/1999 |
| JP | 11-306092 | 11/1999 |
| JP | 11-306673 | 11/1999 |
| JP | 11-308582 | 11/1999 |
| JP | 11-355683 | 12/1999 |
| JP | 2001-069106 | 3/2001 |
| JP | 2001-157166 | 6/2001 |
| JP | 2003-281071 | 10/2003 |
| JP | 2005-073281 | 3/2005 |
| WO | WO 93/25962 | 12/1993 |
| WO | WO 95/34863 | 12/1995 |
| WO | WO 97/46017 | 12/1997 |

OTHER PUBLICATIONS

Fogg Chad, MPEG-FAQ 4.1, May 11, 1995, version 3.1.*
Japanese Office Action, with English translation, issued in Japanese Patent Application No. 2005-113641, mailed May 25, 2010.

* cited by examiner

DATA PROCESSING SYSTEM AND METHOD

BACKGROUND OF THE INVENTION

The present invention relates to data processing systems and data processing methods, and particularly relates to systems and methods for processing data for use in digital TV (DTV) broadcasting, digital versatile discs (DVDs) and Blu-ray discs, for example.

In DTV systems, data received by antennas and subjected to preprocessing takes the form of transport streams (TS). The DTV systems are MPEG-2 systems. In MPEG-2, in addition to the transport stream mentioned above, a program stream (PS) and a packetized elementary stream (PES) packet, which is defined as intermediate data in conversion between the transport stream and the program stream, are used as a data sequence. These data streams are processed as an elementary stream (ES) in the end of processing. These streams (i.e., TS, PS, PES and ES) have respectively different formats according to established standards.

In a DTV system, a transport stream subjected to preprocessing is received by a transport decoder (TD) and divided into audiovisual (AV) data such as an audio signal (audio data), a video signal (video data), a teletext signal (teletext data) and section data such as encryption information and program information, and the divided data is transferred to an external memory to be temporarily stored therein. Out of the temporarily stored data, section data is processed by software in a CPU and AV data is recorded in another devise or is transferred from the external memory to an AV decoder in response to calling from the AV decoder to be decoded.

Processing in the TD is specifically disclosed in patent documents as follows. For example, a storage means for a multiplexed data stream is disclosed in Japanese Unexamined Patent Publication No. 9-275381. A system LSI in which a TD, an AV decoder and a CPU are integrated on one chip is also known. In such a system LSI, memories in which data is temporarily stored are externally provided to the TD and the AV decoder, respectively (see, Japanese Unexamined Patent Publication No. 2001-69106, FIG. 1). As detailed processing in an AV decoder, scaling on video signals in horizontal and vertical directions is disclosed in Japanese Unexamined Patent Publication No. 11-355683.

On the other hand, AV data used in, for example, data for DTV, DVDs and blu-ray discs (BDs) is not permitted to be transferred to transmission lines such as peripheral component interconnect (PCI) buses, Ethernet (a registered trademark) and universal serial buses (USBs) in decrypted states, so that encryption and decryption are needed to perform AV data processing such as recording and dubbing. For encryption and decryption, a buffer having a large capacity is necessary, so that many of systems for encryption and decryption are provided with external memories (see Japanese Unexamined Patent Publication No. 7-297855).

With the foregoing conventional techniques, AV data input to a system LSI from an external device such as a hard disk drive (HDD) is recorded on a recording medium in the following manner. The input data is stored in an external memory externally provided to the system and then is decrypted. The decrypted data is stored in the external memory again and then is encrypted. The encrypted data is transferred to the recording medium.

In such processing, a large part of the band width (transmission band) of the external memory is used and CPU processing is increased for control of the external memory. On the other hand, in a large-scale LSI, external memories are unified to suppress the cost, so that a plurality of interfaces perform data transfer to/from one memory interface. Accordingly, the recording speed on an HDD or other media largely depends on the band width of an external memory and adversely affects the performance of a CPU.

SUMMARY OF THE INVENTION

It is therefore an object of the present invention to reduce the amount of data transfer between a data processing system and an external memory. It is another object of the present invention to reduce the number of settings of the data transfer.

Specifically, a data processing system according to the present invention includes: a stream decoder for decrypting a stream encrypted by broadcast encryption to obtain a first decrypted stream; an internal buffer for storing the first decrypted stream; and an encryption/decryption processor for decrypting a stream encrypted by content encryption to obtain a second decrypted stream and storing the second decrypted stream in the internal buffer, the encryption/decryption processor reading one of the first and second decrypted streams from the internal buffer and encrypting the read-out stream by content encryption.

In this system, the stream decoder and the encryption/decryption processor transfer data to each other using an internal buffer and without using an external buffer, so that the amount of data transferred between an external memory and each of the stream decoder and the encryption/decryption processor is reduced.

A data processing method according to the present invention includes the steps of: decrypting an input stream which is encrypted by broadcast encryption and storing the decrypted stream in an internal buffer; decrypting an input stream which is encrypted by content encryption and storing the decrypted stream in the internal buffer; and encrypting the stream stored in the internal buffer by content encryption.

As described above, according to the present invention, the amount of data transfer between a data processing system and an external memory is reduced and the number of settings of data transfer is reduced. Accordingly, the data processing system operates at higher speed and capacity of the external memory is allowed to be reduced.

DETAILED DESCRIPTION OF THE INVENTION

Hereinafter, embodiments of the present invention will be described with reference to the drawings.

Embodiment 1

Figure 1:
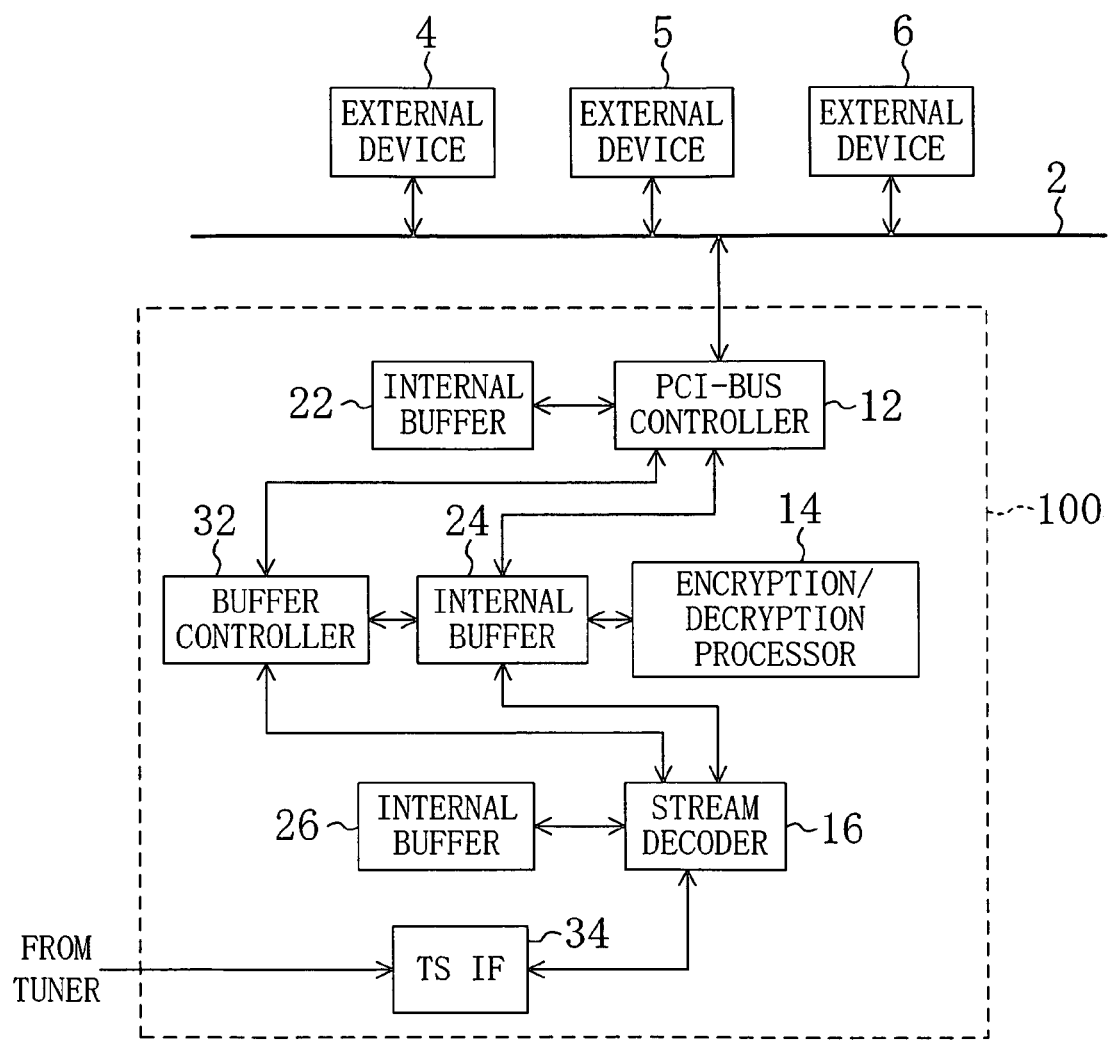
FIG. 1 is a block diagram illustrating a data processing system according to a first embodiment of the present invention.

FIG. 1 is a block diagram illustrating a data processing system according to a first embodiment of the present invention. A data processing system 100 illustrated in FIG. 1 includes: a PCI-bus controller 12 serving as a shared-bus controller; an encryption/decryption processor 14; a stream decoder 16; internal buffers 22, 24 and 26; a buffer controller 32; and a transport stream interface (TSIF) 34.

The data processing system illustrated in FIG. 1 is connected to a PCI bus 2 which is as an example of a shared bus. External devices 4, 5 and 6 are connected to the PCI bus 2. Each of the external devices is a device for recording and playing back data such as AV data and is, for example, an HDD, a DVD-R drive, or a blu-ray disc (BD) drive, for example. Each of the external devices performs writing and reading on an associated recording medium such as a disk.

The TSIF 34 receives a transport stream (TS) output from a tuner which has received DTV broadcasting. This transport stream has been encrypted by broadcast encryption (TS encryption). The TSIF 34 receives this transport stream and outputs valid packets contained in the transport stream to the stream decoder 16, in synchronization with a clock.

When the PCI-bus controller 12, the encryption/decryption processor 14 and the stream decoder 16 perform processing, the internal buffers 22, 24 and 26, respectively, are used as regions in which data is temporarily stored. The PCI-bus controller 12 and the stream decoder 16 also access the internal buffer 24. That is, the PCI-bus controller 12, the encryption/decryption processor 14 and the stream decoder 16 share data in the internal buffer 24.

The buffer controller 32 manages a write completion flag indicating completion of writing in the internal buffer 24 and a read completion flag indicating completion of reading from the internal buffer 24, for each of the encryption/decryption processor 14, the stream decoder 16 and the PCI-bus controller 12. The buffer controller 32 controls writing and reading in/from the internal buffer 24 using these flags.

The stream decoder 16 performs filtering using headers, decrypts data encrypted by broadcast encryption, performs section filtering for selecting valid data from sections in a program specific information (PSI) table and obtains a partial transport stream, with respect to the transport stream output from the TSIF 34. Then, the stream decoder 16 outputs the obtained result to the internal buffer 24 and stores the result therein. Upon input of a packetized elementary stream (PES) or a program stream (PS), the stream decoder 16 performs similar processing on the input stream as necessary.

The PCI-bus controller 12 controls an input and an output from/to the PCI bus 2 and transfers streams read out from the external devices 4 through 6 to the internal buffer 24 by way of the PCI bus 2. The transferred streams have been encrypted by content encryption. The encryption/decryption processor 14 performs decryption of data encrypted by content encryption in the transferred streams necessary for playback, and stores the obtained result in the internal buffer 24. The stream decoder 16 performs section filtering and obtains a partial transport stream with respect to the stream stored from the encryption/decryption processor 14 in the internal buffer 24, and then stores the obtained result in the internal buffer 24 again.

The encryption/decryption processor 14 reads, from the internal buffer 24, processed streams transferred from the external devices 4 through 6 or transport streams decrypted by the stream decoder 16, performs encryption of the streams by content encryption necessary for recording in the external devices, and then stores the obtained result in the internal buffer 24 again. The PCI-bus controller 12 transfers the encryption result stored in the internal buffer 24 to the external devices 4 through 6 by way of the PCI bus 2. The external devices 4 through 6 write received data on respective recording media.

The PCI-bus controller 12 transfers data to be encrypted by the encryption/decryption processor 14 from the internal buffer 24 to an AV decoder (not shown) by way of the PCI bus 2. The AV decoder performs, for example, MPEG decoding on the transferred data and outputs resultant video data and audio data.

In the data processing system illustrated in FIG. 1, the PCI-bus controller 12 and the encryption/decryption processor 14 are allowed to perform data transfer without using an external memory, so that recording in the external devices can be performed irrespective of the bandwidth of an external memory during dubbing of AV data, for example. Since the stream decoder 16 and the encryption/decryption processor 14 are allowed to perform data transfer without using an external memory, data processing is performed at higher speed.

Embodiment 2

Figure 2:
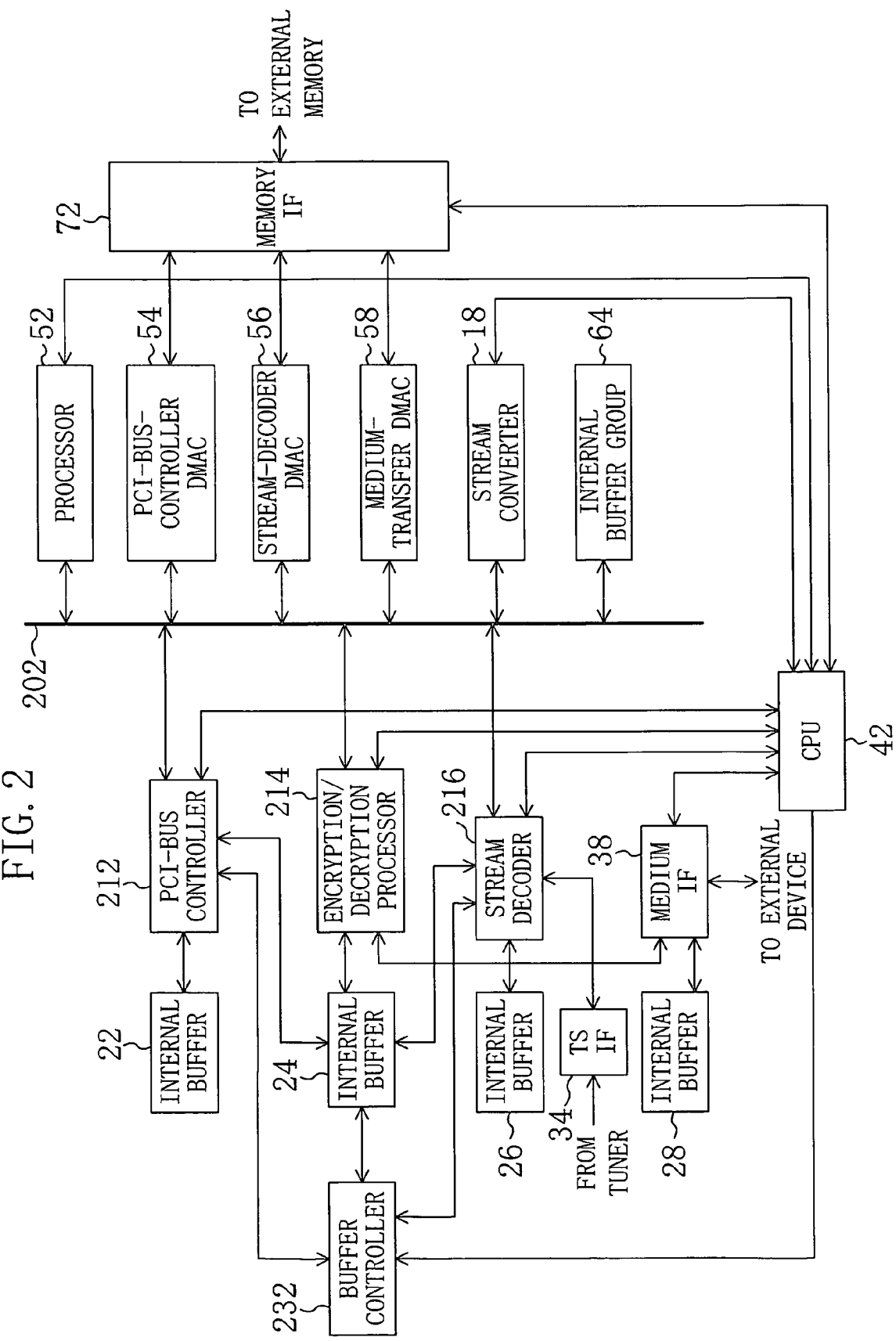
FIG. 2 is a block diagram illustrating a data processing system according to a second embodiment of the present invention.

FIG. 2 is a block diagram illustrating a data processing system according to a second embodiment of the present invention. The data processing system illustrated in FIG. 2 includes: a PCI-bus controller 212; an encryption/decryption processor 214; a stream decoder 216; and a buffer controller 232, instead of the PCI-bus controller 12, the encryption/decryption processor 14, the stream decoder 16, and the buffer controller 32 of the data processing system illustrated in FIG. 1. The data processing system illustrated in FIG. 2 further includes: a stream converter 18; an internal buffer 28; a medium interface (medium IF) 38 serving as an I/O controller; a CPU 42; a processor 52; a PCI-bus-controller direct memory access (DMA) controller 54; a stream-decoder DMA controller 56; a medium-transfer DMA controller 58; an internal buffer group 64; and a memory interface (memory IF) 72. The DMA controllers will be hereinafter referred to as DMACs.

The memory IF 72 is connected to an external memory and receives and outputs data from/to the external memory. The memory IF 72 serves as an interface between the external memory and each of the PCI-bus-controller DMAC 54, the stream-decoder DMAC 56 and the medium-transfer DMAC 58, for example. A stream encrypted by content encryption is transferred between the encryption/decryption processor 214 and the medium IF 38. Data is transferred between the encryption/decryption processor 214 and a PCI bus 202.

The PCI-bus controller 212 and the stream decoder 216 perform data transfer to/from the external memory using the PCI-bus-controller DMAC 54 and the stream-decoder DMAC 56, respectively.

The CPU 42 controls components of the data processing system illustrated in FIG. 2 such as the PCI-bus controller 212, the encryption/decryption processor 214, the stream decoder 216, the stream converter 18, the buffer controller 232, the medium IF 38, the processor 52 and the memory IF 72. The CPU 42 may control the memory IF 72 so as to manage pointers in the external memory.

In the other aspects not described above, the PCI-bus controller 212, the encryption/decryption processor 214, the stream decoder 216 and the buffer controller 232 are substantially the same as the PCI-bus controller 12, the encryption/decryption processor 14, the stream decoder 16 and the buffer controller 32, respectively, illustrated in FIG. 1.

As in the data processing system illustrated in FIG. 1, when the PCI-bus controller 212, the encryption/decryption processor 214 and the stream decoder 216 perform processing, the internal buffers 22, 24 and 26, respectively, are used as regions in which data is temporarily stored. The PCI-bus controller 212 and the stream decoder 216 also access the internal buffer 24. The TSIF 34 is substantially the same as that described with reference to FIG. 1.

The medium IF 38 is, for example, a serial ATA interface. The medium IF 38 reads, from an external device (not shown), a stream stored on a recording medium of the external device and transfers the read-out data to the encryption/decryption processor 214. The encryption/decryption processor 214 decrypts data encrypted by content encryption in the read-out stream. The medium IF 38 receives a stream encrypted by content encryption from the encryption/decryption processor 214 and outputs the encrypted stream to an external device. The external device writes the received stream on a recording medium thereof. The internal buffer 28 is used as a region in which data is temporarily stored when the medium IF 38 performs processing.

The stream converter 18 performs stream conversion, i.e., format conversion between a transport stream and a program stream, using the internal buffer group 64 without using an external memory. For example, the stream converter 18 converts a transport stream decrypted by the stream decoder 216 or a transport stream input from an external device such as an HDD into a program stream, and outputs the program stream to the encryption/decryption processor 214. The program stream is transferred to an external device such as a DVD drive and recorded therein.

The stream converter 18 converts the program stream input from the external device such as a DVD drive into a transport stream, and outputs the transport stream to the encryption/decryption processor 214. The transport stream is transferred to an AV decoder to be displayed or is transferred to an external device such as an HDD to be recorded therein.

The processor 52 is a dedicated processor configured to perform, for example, stream conversion, encryption or decryption. The PCI-bus-controller DMAC 54 controls data transfer between a device connected to the PCI bus 202 and the memory IF 72. Specifically, the PCI-bus-controller DMAC 54 controls such direct data transfer between the device and the external memory.

The stream-decoder DMAC 56 controls data transfer between the stream decoder 216 and the memory IF 72. Specifically, the stream-decoder DMAC 56 controls direct data transfer between the stream decoder 216 and the external memory. The medium-transfer DMAC 58 controls data transfer between the medium IF 38 and the memory IF 72. That is, the medium-transfer DMAC 58 controls direct data transfer between an external device and the external memory.

The processor 52, the PCI-bus-controller DMAC 54, the stream-decoder DMAC 56, the medium-transfer DMAC 58 and the stream converter 18 are connected to the PCI bus 202. The internal buffer group 64 is a buffer group used by these components for data processing.

In the data processing system illustrated in FIG. 2, the PCI-bus-controller DMAC 54, the stream-decoder DMAC 56 and the medium-transfer DMAC 58 are capable of performing data transfer without using an external memory.

The encryption/decryption processor 214 is capable of performing encryption and decryption on data input/output through the DMACs. In the encryption and decryption, the encryption/decryption processor 214 uses the internal buffer 24 and the internal buffer group 64 as memory regions for controlling intermediate data, so that it is possible to perform data transfer among the DMACs while performing encryption or decryption without using an external memory.

In the data processing system illustrated in FIG. 2, the medium IF 38 and the encryption/decryption processor 214 are allowed to perform direct data transfer without using an external memory, so that data is recorded in an external device in, for example, dubbing of AV data, irrespective of the band width of the external memory. The stream decoder 216 and the encryption/decryption processor 214 are also allowed to perform direct data transfer without using an external memory, so that data is processed at higher speed.

In the foregoing example, the encryption/decryption processor 214 and the stream converter 18 perform encryption/decryption and stream conversion, respectively. Alternatively, the processor 52 may perform similar processing by software.

The encryption/decryption and the stream conversion may be executed by additionally using an external memory, according to the capacities of the internal buffer 24 and the internal buffer group 64 and a situation in which these buffers are used. In such a case, the amount of data transferred to the external memory is reduced as compared to the case of using only an external memory. Accordingly, a portion of the band width of the external memory corresponding to the reduced data amount is allowed to be allocated to processing by, for example, the CPU 42. As a result, throughput of the entire data processing system is enhanced. In addition, since the amount of transferred data is reduced, power consumption is also reduced.

The stream decoder 216, the PCI-bus controller 212 and the medium IF 38 may share data written in the external memory by the memory IF 72. In such a case, the amount of data transferred to the external memory is further reduced.

Embodiment 3

Figure 3:
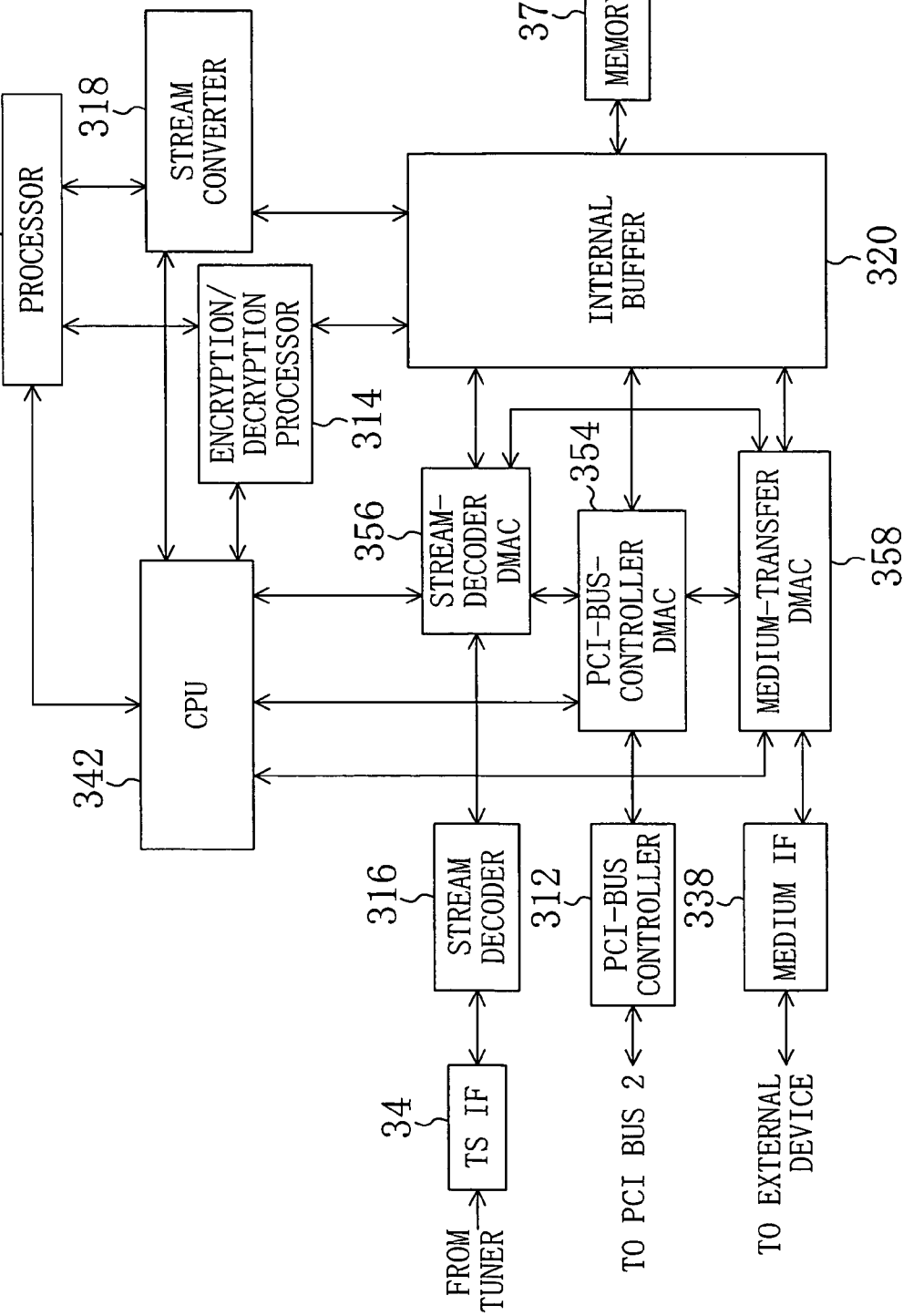
FIG. 3 is a block diagram illustrating a data processing system according to a third embodiment of the present invention.

FIG. 3 is a block diagram illustrating a data processing system according to a third embodiment of the present invention. The data processing system illustrated in FIG. 3 includes: a PCI-bus controller 312 serving as a shared-bus controller; an encryption/decryption processor 314; a stream decoder 316; a stream converter 318; an internal buffer 320; a TSIF 34; a medium IF 338 serving as an I/O controller; a CPU 342; a processor 352; a PCI-bus-controller DMAC 354; a stream-decoder DMAC 356; a medium-transfer DMAC 358; and a memory IF 372.

The memory IF 372 is connected to an external memory. The data processing system illustrated in FIG. 3 is characterized in that data transfer is performed between the data processing system and the external memory through the internal buffer 320.

The TSIF 34 is the same as that described with reference to FIG. 1. The PCI-bus controller 312, the stream decoder 316 and the medium IF 338 are substantially the same as the PCI-bus controller 12 and the stream decoder 16 illustrated in FIG. 1 and the medium IF 38 illustrated in FIG. 2, respectively, except for that these components access the internal buffer 320 through the PCI-bus-controller DMAC 354, the stream-decoder DMAC 356 and the medium-transfer DMAC 358, respectively.

The encryption/decryption processor 314 performs encryption or decryption on data stored in the internal buffer 320 in the same manner as the encryption/decryption processor 14, and writes the obtained result in the internal buffer 320 again. The stream converter 318 performs stream conversion, i.e., format conversion between a program stream and a transport stream, on data in the internal buffer 320, and writes the obtained result in the internal buffer 320 again.

Figure 4:
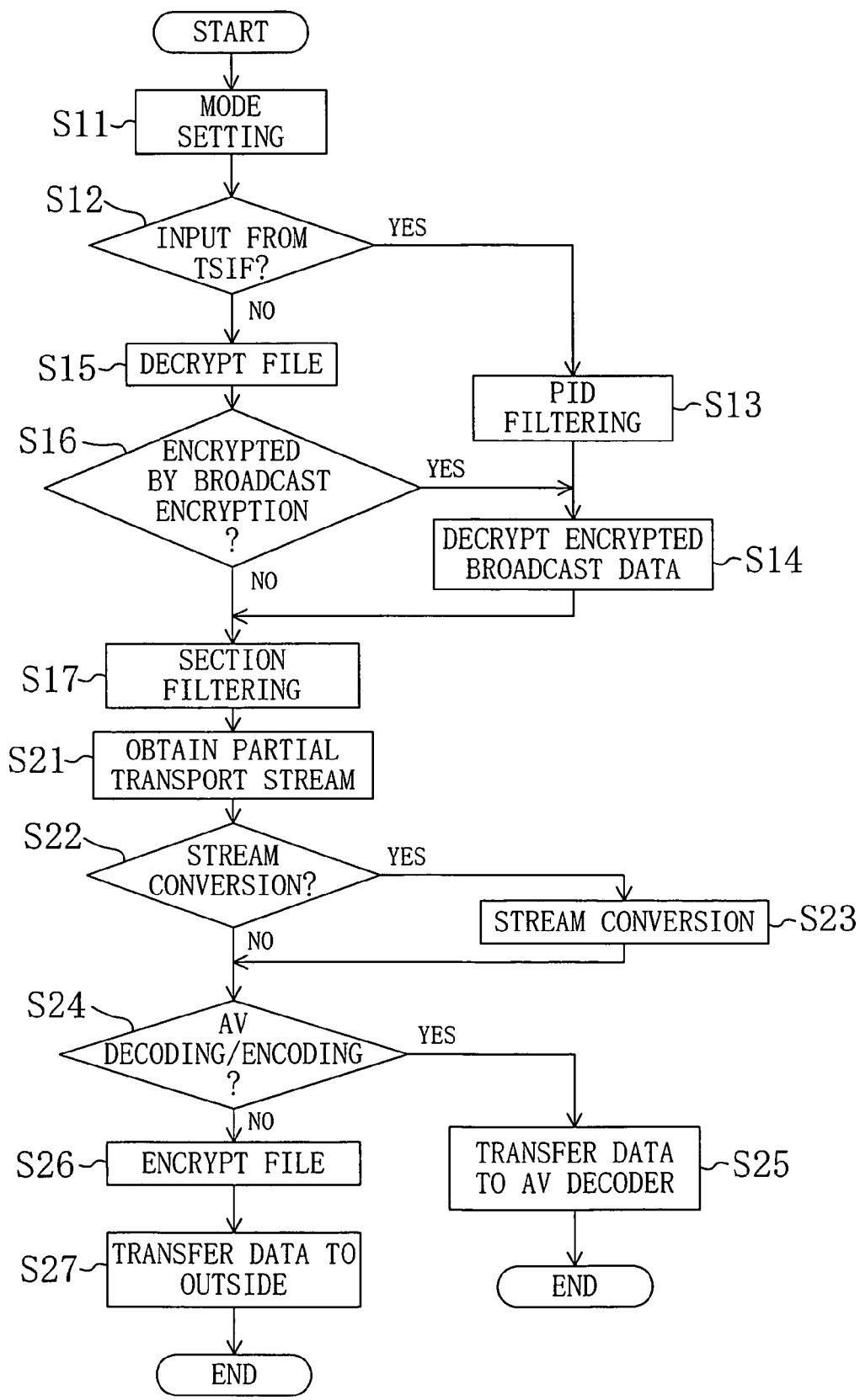
FIG. 4 is a flowchart showing a flow of processing in the data processing system illustrated in FIG. 3.

FIG. 4 is a flowchart of processing in the data processing system illustrated in FIG. 3. Now, process steps shown in FIG. 4 will be described with reference to FIG. 3.

At step S11, the CPU 342 sets an operation mode of the data processing system. In a case in which a stream is input from a tuner, the stream decoder 316 may set the operation mode based on, for example, a value set in the header of the stream. The operation mode indicates whether or not the internal buffer 320 should be used if possible or whether or not suspension of transfer of the stream is allowed or not. The input stream is stored in the internal buffer 320.

At step S12, the CPU 342 determines, based on the header of the input stream, whether or not the input stream has been input from the TSIF 34, i.e., from the tuner. If the input stream has been input from the TSIF 34, the input stream is a transport stream encrypted by broadcast encryption, and thus the process proceeds to step S13. In the other case, the input stream is a stream encrypted by content encryption and input through the medium IF 338 or the PCI-bus controller 312, and thus the process proceeds to step S15.

At step S13, the stream decoder 316 performs PID filtering for selecting valid data, based on a packet identifier (PID) in the header of the input stream. At step S14, the stream decoder 316 decrypts broadcast encrypted data in the transport stream, and stores the resultant stream in the internal buffer 320.

At step S15, the encryption/decryption processor 314 decrypts data in a file encrypted (by content encryption) according to the standard for each recording medium for the stream stored in the internal buffer 320, and stores the resultant stream in the internal buffer 320. At step S16, the stream decoder 316 determines whether data processed at step S15 is encrypted by broadcast encryption or not. If the broadcast encryption is used, the process at step S14 is performed. Otherwise, the process proceeds to step S17. At step S17, the stream decoder 316 performs section filtering for selecting valid data in a section.

At step S21, the stream decoder 316 obtains a partial transport stream if necessary, and stores the processed stream in the internal buffer 320. At step S22, the CPU 342 determines whether stream conversion is necessary or not. If stream conversion is necessary, the process proceeds to step S23 and, otherwise, the process proceeds to step S24.

At step S23, the stream converter 318 performs stream conversion on the stream stored in the internal buffer 320, and writes the converted stream in the internal buffer 320 again. At step S24, the CPU 342 determines whether AV decoding or encoding is necessary or not. If such processing is necessary, the process proceeds to step S25 and, otherwise, the process proceeds to step S26.

At step S25, the CPU 342 outputs the stream in the internal buffer 320 to an AV decoder (not shown). The AV decoder performs MPEG decoding, for example, on the transferred data, and outputs obtained video data and audio data.

At step S26, the encryption/decryption processor 314 performs encryption (by content encryption) on a file for recording in a recording medium in the stream stored in the internal buffer 320 and processed at step S21 or S23, and writes the result in the internal buffer 320 again. At step S27, the medium IF 338 transfers the stream stored in the internal buffer 320 and processed at step S26 to an external device such as an HDD, and writes the stream therein through the medium-transfer DMAC 358.

Figure 5:
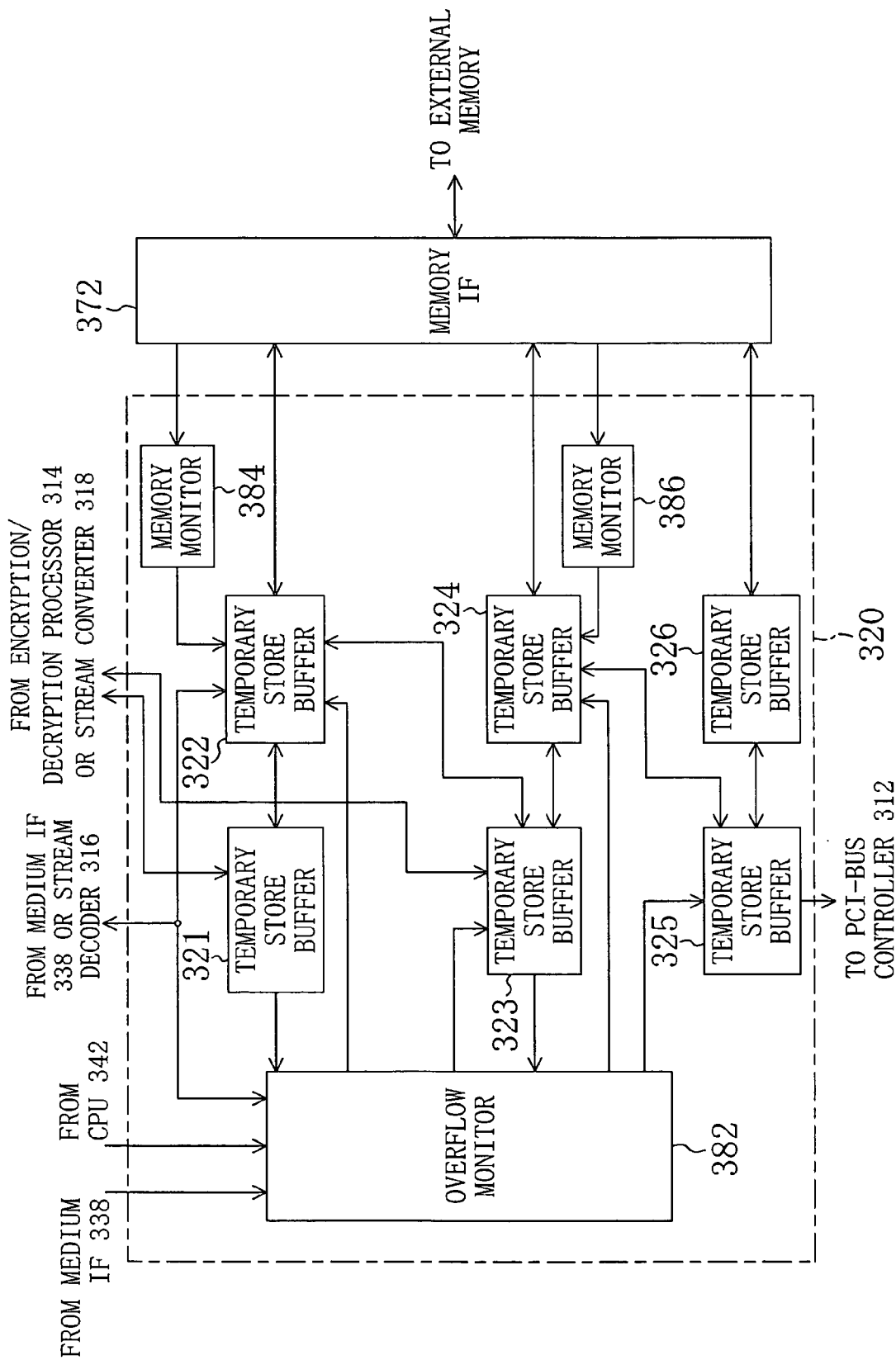
FIG. 5 is a block diagram illustrating an example of a configuration of an internal buffer shown in FIG. 3.

FIG. 5 is a block diagram illustrating an example of a configuration of the internal buffer 320 illustrated in FIG. 3. As illustrated in FIG. 5, the internal buffer 320 includes: temporary store buffers 321, 322, 323, 324, 325 and 326; an overflow monitor 382; and memory monitors 384 and 386.

The temporary store buffer 322 is used by a DMAC for performing data transfer between the temporary store buffer 321 and the memory IF 372. In the same manner, the temporary store buffer 324 is used by a DMAC for performing data transfer between the temporary store buffer 323 and the memory IF 372. The temporary store buffer 326 is used by a DMAC for performing data transfer between the temporary store buffer 325 and the memory IF 372.

The overflow monitor 382 measures a bit rate of a stream input to the internal buffer 320 or receives information from the CPU 342 to grasp the bit rate of the stream input to the internal buffer 320. The overflow monitor 382 monitors the temporary store buffers 321 and 323 and determines whether or not there is a possibility of overflow of the temporary store buffers 321 and 323, based on the bit rate of the input stream and a data processing situation.

If there is a possibility of overflow of the temporary store buffer 321, the overflow monitor 382 notifies the temporary store buffers 322 and 323, the associated DMACs and the encryption/decryption processor 314, for example, of the possibility of overflow. On the other hand, if there is a possibility of overflow of the temporary store buffer 323, the overflow monitor 382 notifies the temporary store buffers 324 and 325, the associated DMACs, the encryption/decryption processor 314 and the stream converter 318, for example, of the possibility of overflow.

Figure 6:
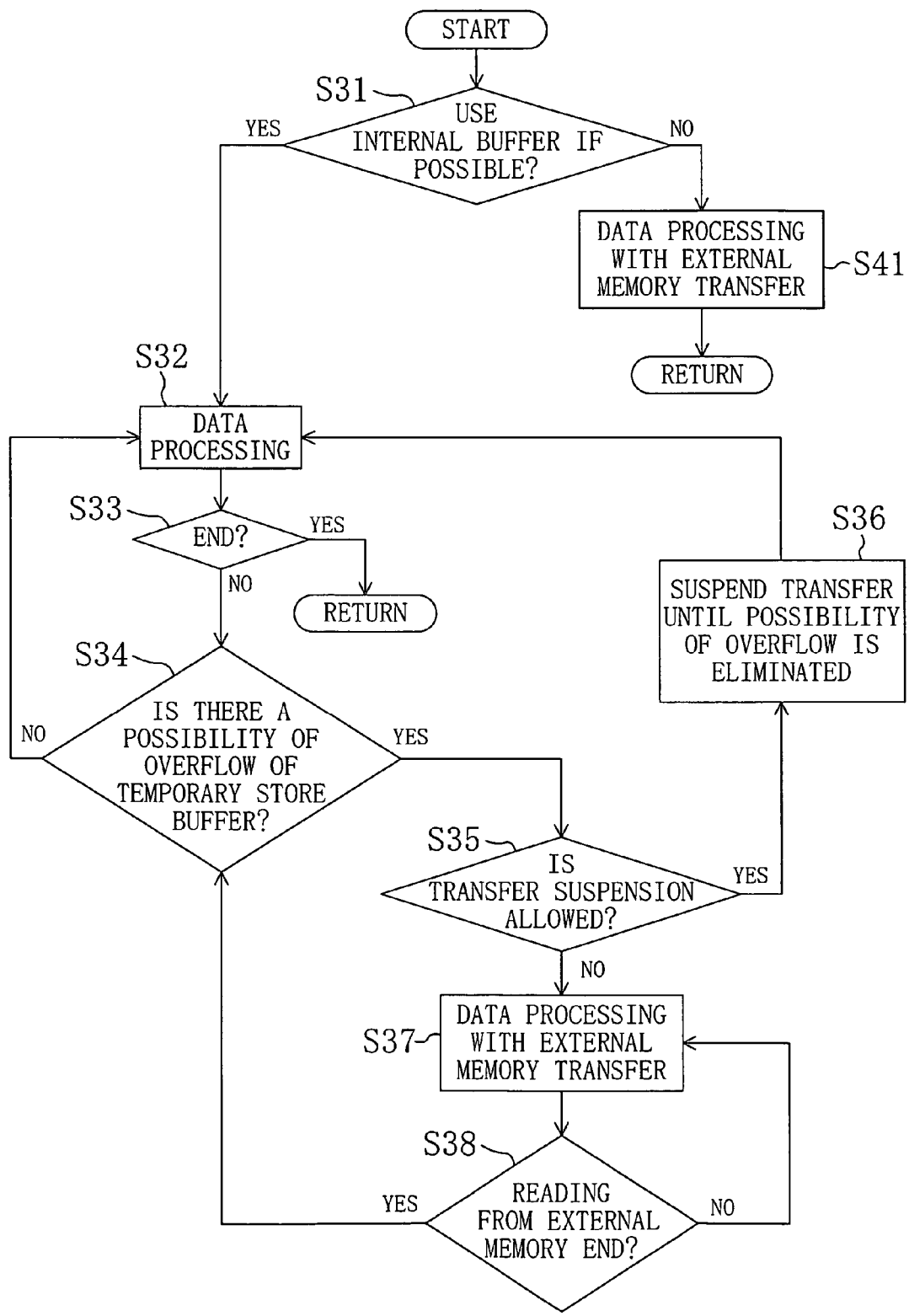
FIG. 6 is a flowchart specifically showing part of steps in the flowchart of FIG. 4.

FIG. 6 is a flowchart specifically showing part of the steps in the flowchart of FIG. 4. FIG. 6 shows processes at steps S14, S15, S23 and S26. As an example, step S15 will be specifically described with reference to FIG. 6.

At step S31, the CPU 342 determines whether or not the operation mode set at step S11 in FIG. 4 is a mode in which the internal buffer 320 should be used if possible. If the operation mode is a mode in which the internal buffer 320 should be used if possible, the process proceeds to step S32 and, otherwise, the process proceeds step S41.

At step S32, data processing is performed using the internal buffer 320 as a region in which data is temporarily stored. More specifically, in step S15, a stream input from an external device to the medium IF 338 is stored in the temporary store buffer 321 by way of the temporary store buffer 322, and the encryption/decryption processor 314 decrypts data encrypted by content encryption in the stored stream using the temporary store buffer 321. The processed data is transferred from the temporary store buffer 321 to the temporary store buffer 323 by way of the temporary store buffer 322.

At step S33, the encryption/decryption processor 314 determines whether the decryption is terminated or not. If the decryption is terminated, the processes in FIG. 6 are terminated and, otherwise, the process proceeds to step S34. At step S34, the overflow monitor 382 determines whether or not there is a possibility of overflow of the temporary store buffer 321. If there is a possibility of overflow, the process proceeds to step S35 and, otherwise, the process returns to step S32.

At step S35, the CPU 342 determines, from the mode set at step S11 in FIG. 4, whether suspension of transfer of the input stream is allowed or not. If suspension of transfer is allowed, the process proceeds to step S36 and, otherwise, the process proceeds to step S37. If a broadcasted stream is input from a tuner, suspension of transfer is not allowed in general. However, if the stream is input from an external device, suspension of transfer is allowed.

At step S36, the encryption/decryption processor 314 suspends transfer of the stream to the temporary store buffer 321 until data in the temporary store buffer 321 is processed and the possibility of overflow of the temporary store buffer 321 is eliminated. Thereafter, the process returns to step S32.

At step S37, data processing together with transfer to an external memory is performed. In this step, the overflow monitor 382 performs control such that the encryption/decryption processor 314 suspends writing in the temporary store buffer 321 and decryption is performed together with data transfer to/from an external memory.

The memory monitor 384 monitors a write pointer indicating a position at which data is written from the encryption/decryption processor 314 and a read pointer indicating a position at which data is read out to the encryption/decryption processor 314 in an external memory. When data in the external memory is processed and these pointers match each other, the memory monitor 384 detects completion of reading of data written from the encryption/decryption processor 314 to the external memory and notifies the encryption/decryption processor 314 and the DMAC using the temporary store buffer 322, for example, of the result.

At step S38, the DMAC using the temporary store buffer 322 determines whether reading from the external memory has been completed or not. If the reading has been completed, data transfer from the external memory is stopped and the process returns to step S34 such that processing using the internal buffer 320 is performed again. Otherwise, the process returns to step S37. At step S34, if there is no possibility of overflow of the temporary store buffer 321, the process returns to step S32 and writing in the temporary store buffer 321 is started again.

At step S41, as at step S37, data processing is performed together with transfer to an external memory. In this step, the encryption/decryption processor 314 performs decryption while performing data transfer to the external memory.

In the foregoing example, the internal buffer 320 includes the temporary store buffers 321 through 326 and performs data transfer to/from the temporary store buffers 321 through 326. Alternatively, the following configuration may be adopted. That is, a portion of a memory is used as the temporary store buffers 321 through 326 and, instead of data transfer, pointers indicating data stored in the respective temporary store buffers 321 through 326 are replaced with one another.

In the description with reference to FIG. 6, at steps S14 and S23 in FIG. 4, it is sufficient that the stream decoder 316 and the stream converter 318 operate instead of the encryption/decryption processor 314 to perform decryption of broadcast encrypted data and stream conversion, respectively. In steps S23 and S26 in FIG. 4, the memory monitor 386 may be used instead of the memory monitor 384 and the temporary store buffers 323 through 325 may be used instead of the temporary store buffers 321 through 323, respectively.

The PCI-bus-controller DMAC 354 transfers, to the PCI-bus controller 312, data in the temporary store buffer 325 obtained through processing by the encryption/decryption processor 314 or the stream converter 318.

Figure 7:
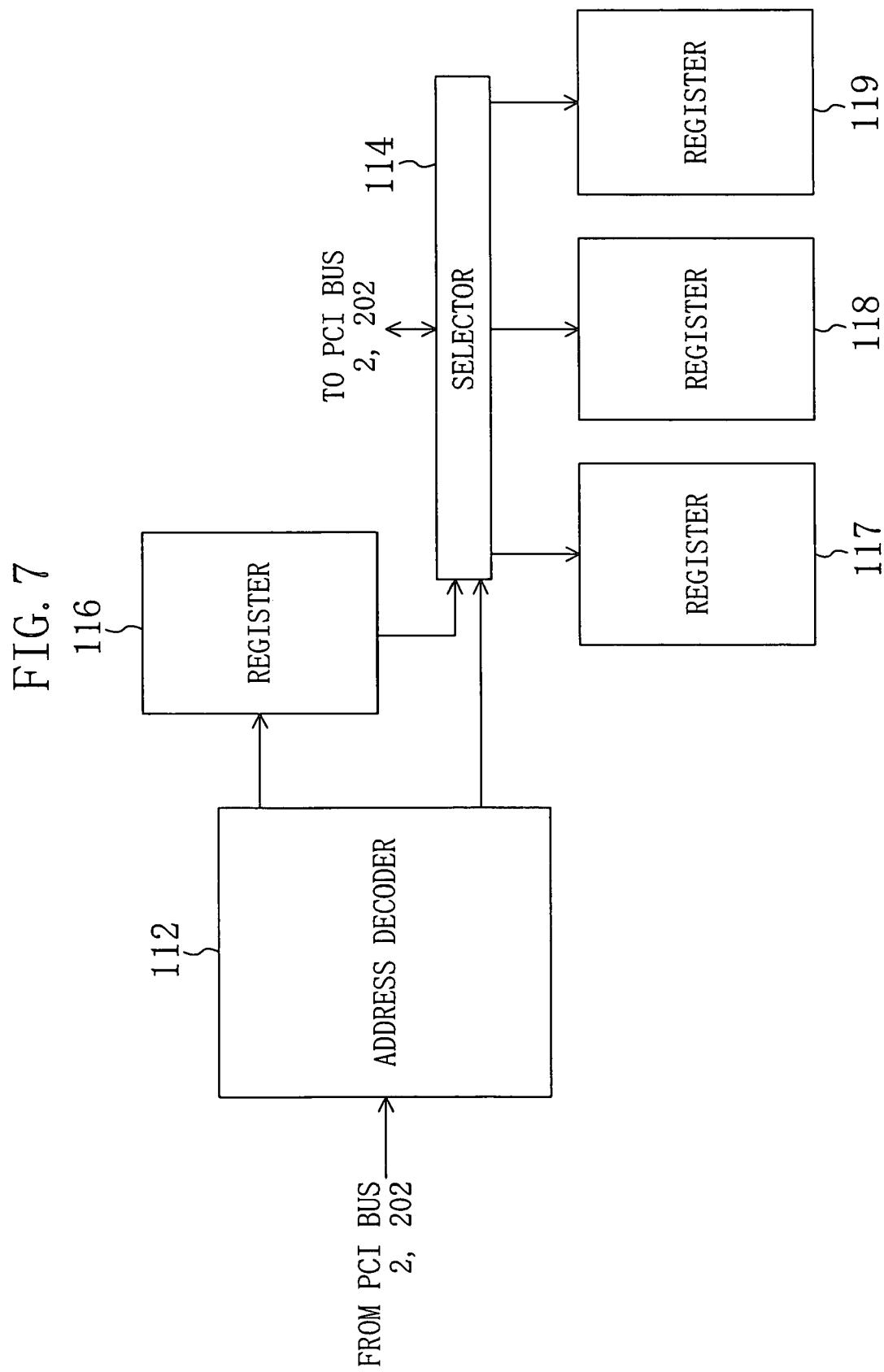
FIG. 7 is a block diagram illustrating an example of a configuration of a register section.

The data processing system illustrated in FIG. 3 may further include a register section. FIG. 7 is a block diagram illustrating an example of a configuration of the register section. The register section illustrated in FIG. 7 includes: an address decoder 112; a selector 114; a first register 116; and second registers 117, 118 and 119.

The address decoder 112 decodes an address specified by the CPU 342 through the PCI bus 2 and selects the register 116. The address decoder 112 stores, in the register 116, a value for use in selection of the registers 117 through 119 by the selector 114. A transfer-destination address and the size of transfer data for each DMA transfer channel are previously stored in each of the registers 117 through 119.

Next, the address decoder 112 selects the selector 114 according to the address specified by the CPU 342. The selector 114 selects one of the registers 117 through 119 according to the value in the register 116 and transfers the value stored in the selected register to the PCI-bus-controller DMAC 354, the stream-decoder DMAC 356 and the medium-transfer DMAC 358 by way of the PCI bus 2.

If the address decoder 112 is configured to directly select one of the registers 117 through 119, the address to be supplied to the address decoder 112 should be changed according to which one of the registers 117 through 119 has a value to be used. Accordingly, in this case, a branch instruction for switching processing needs to be executed.

In the register section illustrated in FIG. 7, if the value indicating one of the registers 117 through 119 to be selected is previously stored in the register 116, it is sufficient that an address for specifying the selector 114 is always supplied to the address decoder 112. Then, no branch instruction needs to be executed, so that DMA transfer is performed at higher speed.

Figure 8:
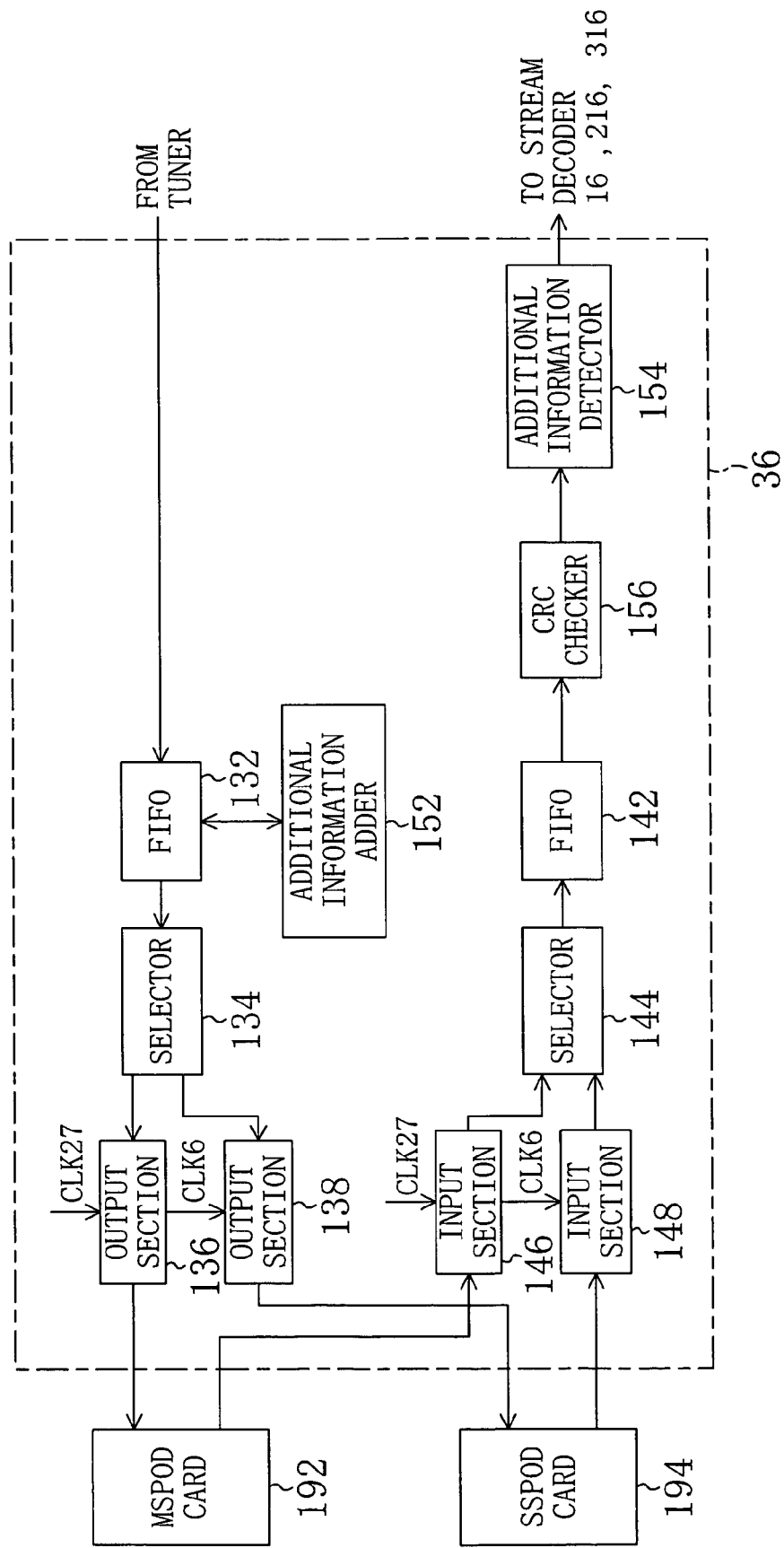
FIG. 8 is a block diagram illustrating an example of a configuration of a POD interface.

The data processing system illustrated in FIG. 3 may further include a point-of-deployment (POD) interface. FIG. 8 is a block diagram illustrating an example of a configuration of the POD interface. The POD interface 36 illustrated in FIG. 8 includes: First-In First-Out (FIFO) buffers 132 and 142; selectors 134 and 144; output sections 136 and 138; input sections 146 and 148; an information adder 152; a cyclic redundancy code (CRC) checker 156; and an additional information detector 154.

A transport stream input from a tuner is input to the FIFO buffer 132. The information adder 152 outputs, to the FIFO buffer 132, packet additional information to be added to the input transport stream. Specifically, if data stored in the FIFO buffer 132 is data for multi-stream POD (MSPOD), the information adder 152 outputs packet additional information. The FIFO buffer 132 adds packet additional information to the input stream and sequentially outputs the resultant stream to the selector 134 in the order of input. The FIFO buffer 132 performs burst output of the transport stream at every 188 bytes.

If the input stream is data for an MSPOD, the selector 134 outputs the stream to the output section 136, whereas if the input stream is data for a single-stream POD (SSPOD), the selector 134 outputs the stream to the output section 138. The output section 136 outputs the stream output from the selector 134 to an MSPOD card 192, in synchronization with a clock CLK27 with a frequency of 27 MHz. The output section 138 outputs the stream output from the selector 134 to an SSPOP card 194, in synchronization with a clock CLK6 with a frequency of 6.75 MHz.

The MSPOD card 192 and the SSPOP card 194 decrypt encrypted data, for example, and output the results to the input sections 146 and 148, respectively. The input sections 146 and 148 operate in synchronization with the clocks CLK27 and CLK6, respectively, and receive input streams in synchronization with the respective clocks. The received streams are output to the selector 144.

If the selector 134 selects the output section 136, the selector 144 selects the input section 146, whereas if the selector 134 selects the output section 138, the selector 144 selects the input section 148. Then, the input stream is output to the FIFO buffer 142 as a stream subjected to external processing.

The CRC checker 156 performs CRC checking on a stream in the FIFO buffer 142 and the stream subjected to the checking is output to the additional information detector 154. The additional information detector 154 detects packet additional information added to the stream subjected to the CRC checking, and outputs the stream to the stream decoder 316.

In this manner, in the POD interface 36 illustrated in FIG. 8, the speed in transferring a stream to a POD card is allowed to be changed, thus making it possible to use both the MSPOD card 192 and the SSPOD card 194.

The data processing systems illustrated in FIGS. 1 and 2 may further include the register section illustrated in FIG. 7 and/or the POD interface 36 illustrated in FIG. 8.

As described above, according to the present invention, the amount of data transferred between a data processing system and an external memory is allowed to be reduced, so that the present invention is useful for systems for, for example, recording streams for DTV.

What is claimed is:

1. A data processing apparatus, comprising:
a stream decoder for decrypting a stream encrypted by broadcast encryption to obtain a first decrypted stream;
first, second, and third temporary store buffers;
a first direct memory access controller for the stream decoder for controlling data transfer between the stream decoder and the first temporary store buffer;
an encryption/decryption processor for decrypting a stream encrypted by content encryption to obtain a second decrypted stream and storing the second decrypted stream in the first temporary store buffer, the encryption/decryption processor reading one of the first and second decrypted streams from the second temporary store buffer, encrypting the read-out stream by content encryption;
a stream converter for performing format conversion between a transport stream and a program stream and outputting the converted stream;
a PCI-bus controller for controlling an input and output of a PCI-bus;
a second direct memory access controller for the PCI-bus controller for controlling data transfer between the PCI-bus and the third temporary store buffer;
fourth, fifth, and sixth temporary store buffers corresponding to the first, second, third temporary store buffers, respectively;
a memory interface for receiving and outputting data between the fourth to sixth temporary store buffers and an external memory; and
an overflow monitor, wherein:
the first temporary store buffer stores the first decrypted stream and the second decrypted stream,
the second temporary store buffer stores a stream transferred from the first temporary store buffer,
the third temporary store buffer stores the converted stream and the stream encrypted in the encryption/decryption processor, and
when there is a possibility of overflow of any of the first to third temporary store buffers, the overflow monitor performs control such that writing in the temporary store buffer that may be overflowed is stopped and the stream converter performs processing while performing data transfer to/from an external memory through one of the forth to sixth temporary store buffers.

2. The data processing system of claim 1, further comprising
a memory monitor for detecting completion of reading of data written in the external memory from the stream converter, based on a difference between a pointer indicating a position at which data is written from the stream converter and a pointer indicating a position at which data is read out to the stream converter in the external memory, wherein
the overflow monitor performs control such that writing in the first to third temporary store buffers is started again when there is no possibility of overflow of the first to third temporary store buffers and the detection by the memory monitor is performed.

3. The data processing system of claim 1, further comprising:
an overflow monitor for performing control such that writing in the first to third temporary store buffers is stopped and the encryption/decryption processor performs encryption while performing data transfer to/from an external memory when there is a possibility of overflow of the first to third temporary store buffers; and
a memory monitor for detecting completion of reading of data written in the external memory from the encryption/decryption processor, based on a difference between a pointer indicating a position at which data is written from the encryption/decryption processor and a pointer indicating a position at which data is read out to the encryption/decryption processor in the external memory, wherein
the overflow monitor performs control such that writing in the first to third temporary store buffers is started again when there is no possibility of overflow of the first to third temporary store buffers and the detection by the memory monitor is performed.

4. The data processing system of claim 1, further comprising:
an overflow monitor for performing control such that writing in the first to third temporary store buffers is stopped and the encryption/decryption processor performs decryption while performing data transfer to/from an external memory when there is a possibility of overflow of the first to third temporary store buffers; and
a memory monitor for detecting completion of reading of data written in the external memory from the encryption/decryption processor, based on a difference between a pointer indicating a position at which data is written from the encryption/decryption processor and a pointer indicating a position at which data is read out to the encryption/decryption processor in the external memory, wherein
the overflow monitor performs control such that writing in the first to third temporary store buffers is started again when there is no possibility of overflow of the first to third temporary store buffers and the detection by the memory monitor is performed.

5. The data processing system of claim 1, further comprising:
an address decoder for decoding an input address;
a first register for outputting a stored value;
a plurality of second registers for storing respective values; and
a selector for selecting one of the second registers according to the value output from the first register and outputting the value stored in the selected second register, upon selection according to the decoded result obtained by the address decoder.

6. The data processing system of claim 1, further comprising:
an information adder for outputting packet additional information to be added to a stream;

a First-In First-Out (FIFO) buffer for adding the packet additional information to the stream and outputting the resultant stream;

a first output section for outputting the stream output from the FIFO buffer to outside the system in synchronization with a first clock;

a first input section for receiving, in synchronization with the first clock, the stream output from the first output section and processed outside the system, and outputting the received stream as an externally-processed stream;

a cyclic redundancy code (CRC) checker for performing CRC checking on the externally-processed stream; and an additional information detector for detecting the packet additional information added to the stream subjected to the CRC check.

7. The data processing system of claim 6, further comprising:

first and second selectors;

a second output section for outputting the stream output from the FIFO buffer to outside the system in synchronization with a second clock with a frequency different from that of the first clock; and a second input section for receiving, in synchronization with the second clock, the stream output from the second output section and processed outside the system, and outputting the resultant stream, wherein:

the first selector outputs a stream output from the FIFO buffer to a selected one of the first and second output sections, and the second selector selects the output from the first input section when the first selector selects the first output section, while selecting the output from the second input section when the first selector selects the second output section, and the second selector outputs the selected output to the CRC checker as the externally-processed stream.

8. The data processing system of claim 1, further comprising:

a memory monitor for detecting completion of reading of data written in an external memory from the encryption/decryption processor, based on a difference between a pointer indicating a position at which data is written from the encryption/decryption processor and a pointer indicating a position at which data is read out to the encryption/decryption processor in the external memory, wherein:

the overflow monitor performs control such that writing in the first to third temporary store buffers is stopped and the encryption/decryption processor performs encryption while performing data transfer to/from the external memory when there is a possibility of overflow of the first to third temporary store buffers, and the overflow monitor performs control such that writing in the first to third temporary store buffers is started again when there is no possibility of overflow of the first to third temporary store buffers and the detection by the memory monitor is performed.

9. The data processing system of claim 1, further comprising:

a memory monitor for detecting completion of reading of data written in an external memory from the encryption/decryption processor, based on a difference between a pointer indicating a position at which data is written from the encryption/decryption processor and a pointer indicating a position at which data is read out to the encryption/decryption processor in the external memory, wherein:

the overflow monitor performs control such that writing in the first to third temporary store buffers is stopped and the encryption/decryption processor performs decryption while performing data transfer to/from the external memory when there is a possibility of overflow of the first to third temporary store buffers, and the overflow monitor performs control such that writing in the first to third temporary store buffers is started again when there is no possibility of overflow of the first to third temporary store buffers and the detection by the memory monitor is performed.

* * * * *